United States Patent
Peterson et al.

(10) Patent No.: US 12,260,488 B2
(45) Date of Patent: *Mar. 25, 2025

(54) METHODS AND GRAPHICS PROCESSING UNITS FOR DETERMINING DIFFERENTIAL DATA FOR RAYS OF A RAY BUNDLE

(71) Applicant: Imagination Technologies Limited, Kings Langley (GB)

(72) Inventors: Luke T. Peterson, San Francisco, CA (US); James Jones, Kings Langley (GB); Aaron Dwyer, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,171

(22) Filed: Nov. 6, 2023

(65) Prior Publication Data
US 2024/0070966 A1    Feb. 29, 2024

Related U.S. Application Data

(63) Continuation of application No. 16/116,699, filed on Aug. 29, 2018, now Pat. No. 11,810,239, which is a (Continued)

(51) Int. Cl.
*G06T 15/00*   (2011.01)
*G06T 1/20*    (2006.01)
(Continued)

(52) U.S. Cl.
CPC ............ *G06T 15/06* (2013.01); *G06T 1/20* (2013.01); *G06T 15/20* (2013.01); *G06T 15/80* (2013.01); *G06T 17/20* (2013.01); *G06T 2200/04* (2013.01)

(58) Field of Classification Search
USPC .................................................. 345/418
See application file for complete search history.

(56) References Cited

U.S. PATENT DOCUMENTS 8,035,898 B2    10/2011   Minano et al.
8,310,481 B2    11/2012   Bailey
(Continued)

FOREIGN PATENT DOCUMENTS

EP    2610814 A1     7/2013
JP    H10293782 A    11/1998
(Continued)

OTHER PUBLICATIONS

Christensen et al., "Ray Differentials and Multiresolution Geometry Caching for Distribution Ray Tracing in Complex Scenes," Computer Graphics Forum, vol. 22, No. 3, Blackwell Publishing, Inc. 2003.
(Continued)

*Primary Examiner* — Phu K Nguyen
(74) *Attorney, Agent, or Firm* — Potomac Law Group, PLLC; Vincent M DeLuca

(57) ABSTRACT

Graphics processing system configured to perform ray tracing. Rays are bundled together and processed together. When differential data is needed by a shader, the data of a true ray in the bundle can be used rather than processing separate tracker rays.

20 Claims, 4 Drawing Sheets

Related U.S. Application Data continuation of application No. 15/458,110, filed on Mar. 14, 2017, now Pat. No. 10,089,777.

(60) Provisional application No. 62/307,817, filed on Mar. 14, 2016.

(51) Int. Cl.
   *G06T 15/06* (2011.01)
   *G06T 15/20* (2011.01)
   *G06T 15/80* (2011.01)
   *G06T 17/20* (2006.01)

(56) References Cited

U.S. PATENT DOCUMENTS

| | | |
|---|---|---|
| 8,441,477 B2 | 5/2013 | Kho et al. |
| 8,482,561 B2 | 7/2013 | McCombe et al. |
| 8,525,826 B2 | 9/2013 | Nutter et al. |
| 8,587,588 B2 | 11/2013 | Smyth |
| 8,593,458 B2 | 11/2013 | McCombe et al. |
| 8,665,271 B2 | 3/2014 | Nutter et al. |
| 8,797,322 B2 | 8/2014 | Peterson et al. |
| 8,952,961 B2 | 2/2015 | Peterson et al. |
| 9,228,921 B2 | 1/2016 | Yamazoe |
| 9,460,546 B1 * | 10/2016 | Stich ................. G06T 15/06 |
| 9,460,547 B2 | 10/2016 | McCombe et al. |
| 9,704,283 B2 | 7/2017 | Ozdas et al. |
| 10,089,777 B2 | 10/2018 | Peterson et al. |
| 10,217,266 B2 | 2/2019 | Howson et al. |
| 10,453,245 B2 | 10/2019 | Ozdas et al. |
| 10,832,371 B2 | 11/2020 | Doyle et al. |
| 2009/0167763 A1 | 7/2009 | Waechter et al. |
| 2009/0322752 A1 * | 12/2009 | Peterson ............. G06T 15/80 |
| | | 345/426 |
| 2010/0073369 A1 | 3/2010 | McCombe et al. |
| 2010/0328310 A1 | 12/2010 | Peterson et al. |
| 2012/0133654 A1 * | 5/2012 | Redgrave .......... G06F 8/4442 |
| | | 345/522 |
| 2012/0139926 A1 * | 6/2012 | Clohset ............ G06T 15/005 |
| | | 345/502 |
| 2013/0050213 A1 | 2/2013 | McCombe et al. |
| 2013/0328871 A1 * | 12/2013 | Piemonte ............. G06T 13/00 |
| | | 345/420 |
| 2014/0333623 A1 | 11/2014 | Ozdas et al. |
| 2016/0063753 A1 * | 3/2016 | Peterson ............. G06T 15/08 |
| 2016/0275718 A1 * | 9/2016 | Subr .................. G06T 15/00 |
| 2017/0263044 A1 | 9/2017 | Peterson et al. |

FOREIGN PATENT DOCUMENTS

| | | |
|---|---|---|
| JP | 2012503259 A | 2/2012 |
| WO | 2010033942 A1 | 3/2010 |

OTHER PUBLICATIONS

Igehy, "Tracing Ray Differentials," Proceedings of the 26th annual conference on Computer graphics and interactive techniques (SIGGRAPH '99), pp. 179-186, 1999.

Hanika et al., "Two-Level Ray Tracing with Reordering for Highly Complex Scenes," GI '10: Proceedings of Graphics Interface 2010, pp. 145-152, May 2010.

Lauterbach, "Interactive Ray Tracing of Massive and Deformable Models," ProQuest LLC, UMI No. 3428375 (2010).

Mansson et al., "Deep Coherent Ray Tracing," IEEE Symposium on Ray Tracing (2007).

Reshetov et al., "Multi-Level Ray Tracing Algorithm," ACM Transactions on Graphics ,vol. 24, Issue 3, pp. 1176-1185 (2005).

Shirayanagi, "Methods for Calculating the Vergence of an Astigmatic Ray Bundle in an Optical System that Contains a Freeform Surface," Opt. Rev (2016) 23:730-745.

Sporring et al., "Spatial and Temporal Ray Differentials," Department of Computer Science: Museum Tusculanum, Technical Report No. 09/04, 2009.

Szirmay-Kalos et al., "Specular Effects on the GPU: State of the Art," Journal Compilation, The Eurographics Association and Blackwell Publishing Ltd., 2009.

Van Der Zwaan et al., "Pyramid Clipping for Efficient Ray Traversal," Rendering Techniques'95, 10.1007/978-3-7091-9430-0_1, (1998).

Wald et al., "Interactive Rendering with Coherent Ray Tracing," Eurographics, vol. 20, the Eurographics Association and Blackwell Publishers 2001.

Wald et al., "Realtime Ray Tracing and its use for Interactive Global Illumination," STAR-State of the Art Report, Eurographics, 2003.

Wald et al., "State of the Art in Ray Tracing Animated Scenes," STAR Proceedings of Eurographics 2007, pp. 89-116, 2007.

Bigler et al; "Design for Parallel Interactive Ray Tracing Systems"; IEEE Symposium on Interactive Ray Tracing; Sep. 2006; pp. 187-196.

Boulos et al; "Packet-based whited and distribution ray tracing"; Graphics Interface 2005; May 28, 2007; pp. 177-184.

* cited by examiner

METHODS AND GRAPHICS PROCESSING UNITS FOR DETERMINING DIFFERENTIAL DATA FOR RAYS OF A RAY BUNDLE

CROSS-REFERENCE TO RELATED APPLICATIONS AND CLAIM OF PRIORITY

This application is a continuation under 35 U.S.C. 120 of copending application Ser. No. 16/116,699 filed Aug. 29, 2018, now U.S. Pat. No. 11,810,239, which is a continuation of prior application Ser. No. 15/458,110 filed Mar. 14, 2017, now U.S. Pat. No. 10,089,777, which claims priority under 35 U.S.C. 119 from Provisional Application Ser. No. 62/307,817 filed Mar. 14, 2016, the contents of which are incorporated by reference herein in their entirety.

BACKGROUND

The description herein generally relates to 3-D rendering systems, system architectures, and methods. Some of the examples described herein relate to systems, architectures, and methods for asynchronous and concurrent hybridized rendering, such as hybridized ray tracing and rasterization-based rendering.

Graphics Processing Units (GPUs) often provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, and may be adapted to be suited for particular uses. When designing a GPU, there is often a trade-off between various factors such as performance, size, power consumption and cost. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is rarely an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

As an example, ray tracing is particularly suited for introducing lighting effects into rendered images. Sources of light may be defined for a scene which cast light onto objects in the scene. Some objects may occlude other objects from light sources resulting in shadows in the scene. Rendering using a ray tracing technique allows the effects of light sources to be rendered accurately since ray tracing is adapted to model the behaviour of light in the scene.

Some operations performed in graphics processing systems involve determining differential data. Differential data indicates the rate of change of an attribute for changes in the horizontal or vertical pixel position (dx or dy). For example, the distance from a render plane of an object in the scene affects the magnitude of a shift in scene space that corresponds to a shift in space. As a further example, if a surface is inclined with respect to the viewpoint from which a scene is being rendered then a one-pixel shift vertically in screen-space may correspond to a different shift in scene-space than a one-pixel shift horizontally in scene-space. The gradient data (i.e. differential data) can be useful for various functions, e.g. selecting an appropriate mip map level of a texture to be applied to a surface in the scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a computer-implemented method of processing rays in a graphics processing system for rendering a scene, the method comprising:
  grouping a plurality of rays together into a ray bundle;
  performing intersection testing on the rays of the ray bundle in the scene;
  using results of the intersection testing for the rays of the ray bundle to determine whether the rays are to be maintained in the ray bundle; and
  executing one or more shader programs on the rays in the ray bundle, wherein the execution of at least one of the shader programs comprises determining differential data for a particular ray of the ray bundle using data for another ray of the ray bundle.

There is provided a graphics processing unit configured to render a scene, the graphics processing unit comprising:
  a bundling module configured to group a plurality of rays together into a ray bundle;
  intersection testing logic configured to perform intersection testing on the rays of the ray bundle, and to use results of the intersection testing for the rays of the ray bundle to determine whether the rays are to be maintained in the ray bundle; and
  processing logic configured to execute one or more shader programs on the rays in the ray bundle including determining differential data for a particular ray of the ray bundle using data for another ray of the ray bundle.

There is provided a computer-implemented method of processing rays in a graphics processing system, the method comprising:
  grouping a plurality of rays together into a ray bundle;
  performing intersection testing on the rays of the bundle; and
  executing a plurality of instances of a shader program, an instance corresponding to a ray in the bundle;
  wherein the shader program is operable to utilize data from a first ray of the bundle in the execution of the instance for a second ray in the bundle.

The method may further comprise:
  emitting a secondary ray from each of two or more instances of the shader program; and
  grouping the secondary rays into another ray bundle.

There is also provided a non-transitory computer readable storage medium having stored thereon a computer readable description of an integrated circuit that, when processed in an integrated circuit manufacturing system, causes the integrated circuit manufacturing system to manufacture a graphics processing unit as described in any of the examples herein. The graphics processing units described herein may be embodied in hardware. There may also be provided an integrated circuit manufacturing system comprising: a non-transitory computer readable storage medium having stored thereon a computer readable description of an integrated circuit that describes a graphics processing unit as described in any of the examples herein; a layout processing system configured to process the integrated circuit description so as to generate a circuit layout description of an integrated circuit embodying the graphics processing unit as described in any of the examples herein; and an integrated circuit generation system configured to manufacture the graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
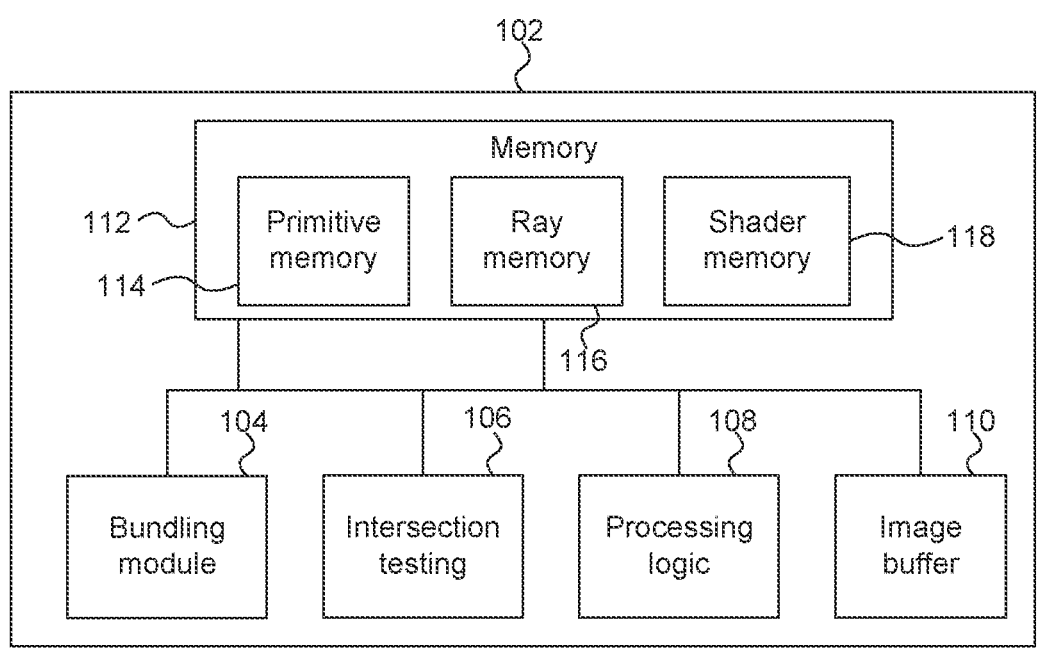
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

In some rendering systems, virtual DX and DY rays are formed in order to determine differential data. These virtual rays may be referred to as "tracker" rays or "feeler" rays. According to OpenRL, differential rays (i.e. the tracker rays) are computed in the frame shader by running the frame shader code in triplicate "tracks". The DX track's frame coordinate has vec2(1, 0) added to it, and the DY track's frame coordinate has vec2(0, 1) added to it. In this way when a ray is traced from a scene position corresponding to a screen position (x,y), two tracker rays are also processed from scene positions corresponding to screen positions (x+1,y) and (x,y+1). However, this means that for the next pixel over in X, the same math for this pixel's DX ray will be performed again, and similarly in Y. The "main" track for the adjacent pixels will redundantly compute and store this data.

It has been appreciated herein that differential rays are used to compute the rate of change of smoothly varying functions of a shader running on one primitive with respect to the screen. The difference between the differential ray value and the main ray value is the differential value (the finite differencing method of derivative approximation), when the main ray and the differential rays hit the same primitive.

In examples described herein if a tracker ray for a pixel is redundant with the main ray for the adjacent pixel, and the rays have matching intersections with geometry in the scene, then an implementation of ray traced differentials could find the intersections for a group of pixels' rays and shade them all at the same time. In other words, rays can be grouped together into a ray bundle, and if the ray bundle does not diverge (e.g. due to different intersection testing results) then the rays of a ray bundle can be used as differential rays for each other, without tracing additional tracker rays. This can eliminate the need to store virtual tracker ray data. It can eliminate the computation of virtual intersections and normalization of virtual ray directions as a shader preamble. It can eliminate the need for the compiler to produce triplicate code. It can eliminate the need to execute triplicate shader code. Furthermore, it can improve texture throughput in the rendering system.

Rays are kept together in groups (e.g. groups of 4, or more, or less (e.g. once some rays are lost from the group)) as they are emitted and if they hit the same thing for shading purposes, then when the shading runs we can leverage data from one ray's execution to imply the differential data for another ray in the same group. These groups may be referred to as ray bundles. If a ray bundle comprises four rays it may be referred to as a "quadray".

In some examples, all rays may get their start from a shader and shaders that can emit rays are enqueued for execution in response to ray intersections, compute workload dispatches, and pixels in a buffer. The shaders may for example be pixel/fragment/frame shaders. Pixels or fragments may be processed in tiles of the rendering space so locality exists between pixels/fragments being processed, i.e. consecutively processed pixels are likely to be located close to each other in the rendering space. A pixel/fragment/frame shader may need to determine differential data, e.g. for use in determining its pixel/fragment footprint or for selecting a mip map level. For example, GLSL (Open GL Shading Language) functions like fwidth, dFdx, dFdy, use differential data. A shading cluster is able to consult the neighbouring fragment in the ray bundle, either in +x, −x, +y or −y, to determine the value of a variable needed for shading from the neighbouring location. These neighbouring locations are often adjacent pixels but might be multisample fragments within the same pixel and may even represent locations is further than one pixel away for reduced resolution rendering.

Since this locality in fragments exists, when a frame shader emits a ray, it is likely that its neighbours will emit rays also. Graphics processing system may make use of SIMD execution, and in this case these rays are substantially all emitted together. It is also likely that these rays have similar origins and directions. Therefore, we can bundle these rays together. The bundling could be an explicit decision made by the shader, e.g. written by the author of the shader code. For example, a feature may be provided in a shading or compute language used with ray tracing, such as a keyword, to denote data elements for which the rate of change with respect to another quantity such as pixels in an output buffer may be tracked or calculated. An API could be provided to allow visibility of the bundling functionality to a programmer to allow them to make efficient use of the bundling. Alternatively, the bundling may be done by a hardware or software module (referred to below as a "bundling module") that is able to perform analysis of the rays to determine which rays to group together into ray bundles, e.g. based on a likelihood that the rays will split from the ray bundle. The aim may be to group together rays into a ray bundle that will not split from the ray bundle during processing. As is apparent from the description herein, when the rays do not split from the ray bundles, the bundling of rays is particularly effective in reducing the number of tracker rays that are generated. In some examples, rays may be grouped together into a ray bundle based on emission concurrency of adjacent shaders in a task. Adjacency may be based on fragment position. Adjacency could be based on position in a compute shader dispatch buffer. Adjacency could be due to being part of the same incoming ray bundle/group.

Once ray bundles have been assembled for primary rays, the rays of the ray bundles are traversed together. The traversal comprises performing intersection testing on the rays to determine whether the ray intersects with geometry in the scene. The results of the intersection testing for a ray may include an indication as to whether the ray intersected any geometry, and if the ray does have an intersection then the results of the intersection testing also include data relating to the intersection, such as an identifier of the element of geometry (e.g. primitive, mesh, object, etc.) that is intersected, a position at which the intersection occurred, a surface normal of the geometry at the intersection, and/or an indication of a shader that is to be invoked due to the intersection. If a ray in a ray bundle is determined to hit an incompatible object (one that must be shaded by a different operation or possibly with different parameters) it is lost from the bundle. In other words, if the intersection testing results of a ray in a ray bundle do not match the intersection testing results of other rays in the ray bundle then the ray may be split from the ray bundle. Lost rays can become tracker rays, such that they can continue to carry valid data in the ray bundle in order to supplement the other rays of the ray bundle with differential data. Each ray in the ray bundle may have an indication (e.g. a bit) to indicate whether the ray is an "active" ray or a "tracker" ray. When a ray is split from a ray bundle it is processed as an active ray separate to the ray bundle.

When a bundle has a valid intersection (or miss resulting in a shade), shaders again execute for all active rays in the bundle (and possibly some tracker rays). Those shaders now have available to them the same parallel tracks as the original fragment shaders had, in order to resolve differential values (e.g. in GLSL, that is calls to dFdx, dFdy, fwidth, sample, etc.).

When secondary rays are emitted, they can be emitted as ray bundles or not, depending on whether or not there are enough active rays for the incoming bundle executing the same shader.

When some threshold number of rays are lost from a ray bundle, it can become more efficient to track the rays in a different data structure from the ray bundle.

The ray bundle functionality may be expressed through a shader programming interface. In some implementations the fact that the rays are bundled together may be hidden from the shader author, and the bundling of the rays may be implemented as a detail of the hardware. More efficiency may be possible by explicitly controlling the bundling explicitly with the shader, since the author of the shader code may be able to indicate which rays are suitable to be bundled together (e.g. because they are not likely to diverge or split from the ray bundle for some reason).

In terms of what is considered the same surface/material/object for shading purposes, this may be restricted to the same mesh in some examples, but in other examples, the same mesh, the same triangle, the same object, or just the same shader program may indicate that rays are to be maintained in a ray bundle.

The bundling of rays allows for optimizations in ray storage and possibly arithmetic cost (mostly in traversal, but also shader setup, and possibly elsewhere) by sharing some data that is common between rays. This may extend into numerical representations of quantities, e.g. if all ray origins are grouped tightly enough together, the system may be able to share the exponent of the floating point numbers, or possibly even some of the mantissa bits.

For example, a single data structure representing 4 rays could be composed of a single full floating point 3-component vector to represent one ray origin, and a normalized 3-component vector to represent one ray direction, and 3 limited precision delta vectors for the additional ray origins and 3 limited precision delta vectors for the additional ray directions. This data structure features a maximum distance between the origins of all rays in the bundle as well as a maximum divergence for all rays.

The implementation could choose to pack rays into such a data structure if it was determined that the data lost in such a packing was acceptable.

Alternatively the programmer could indicate that the rays were intended as coherent and therefore would be amenable to packing, by use of an API or shader-based mechanism as the rays are emitted. Such a mechanism would allow the implementation to allocate a ray bundle data structure in advance. It would also allow the implementation to truncate or otherwise disregard un-representable data, which would enhance the efficiency of such an implementation.

During ray traversal, ray bundles represented as coherent data structures can be tested as frusta or other bounding shapes, in order to reject triangles or other intersectable objects with which there is no chance of intersection for any rays in the bundle.

In some examples, a decision as to when to consider a ray bundle to have diverged is based on shader sameness for the rays in the ray bundle. But this decision could be based on other factors, such as when multiple rays cannot be accurately represented by the shared bundle format. Alternatively, if this logic is combined with a traditional path tracer, the decision could be based on whether the rays take a different path through a hierarchy of an acceleration structure used in intersection testing.

The module which finds intersections for rays (the intersection testing logic) sends the rays of a ray bundle to a shader together. As long as the rays in the ray bundle have matching intersection testing results, then they can all be shaded simultaneously on execution units and differentials can be computed with cross-instance subtraction. Intersection testing results may be considered to match if the rays all hit the same mesh or primitive or object and in some embodiments there may be other continuity requirements to be met in order for intersection testing results to be considered to match. Intersection testing results do not have to be exactly the same to be considered to match. In other words, a complete match is not necessary. Intersection testing results may match if they are the same in one or more particular respects (e.g. the same mesh was intersected, or some other respect, e.g. the same shader is invoked) even if they differ in other respects. For example, an intersection with a different primitive of the same mesh may be considered a matching intersection testing result in some examples. In other examples, an intersection with a different primitive may be considered a non-matching intersection testing result. The definition of matching intersection testing results is an implementation choice.

The hardware may be fully aware of bundles as a data structure. The rays in a ray bundle are somewhat spatially coherent, so they will probably travel in similar directions and finish intersection testing at a more similar time to each other than a random set of rays would. So waiting for all of the rays of a ray bundle to be intersection tested before shading any of the rays in the ray bundle will not add a great deal of latency.

If the rays of a ray bundle do not all hit the same primitive or hit a totally different part of the primitive, then the bundle needs to be broken up somehow. The functions being differentiated are assumed to be continuous and smooth and so the differentials should still be valid, since theoretically, a ray an infinitesimal distance from the main ray could have been used rather than the one the next pixel over, and an equally valid differential could be computed from it. In order to have valid differentials after intersection divergence, an alternative method of ray differentials will be selectively used. The ray which was formerly the neighbour in a ray bundle but which now goes "somewhere else" will be used as a virtual DX or DY ray (i.e. a "tracker" ray) and intersections with the plane-extension of the hit-triangle are computed. In other words, a first ray intersects a primitive, but one or more other rays in the ray bundle do not. The plane of the primitive is extended to see where and how the other ray(s) intersect with the plane in order to determine the tracker ray(s) for the first ray. The tracker rays may be marked as such in the ray bundle such that the shader knows to treat them as tracker rays. The other ray(s) which did not intersect with the primitive are split from the ray bundle and processed separately to the ray bundle, e.g. in a similar manner to a prior art system whereby tracker rays are generated to the rays that have split from the ray bundle. It may be possible to group rays which have split from different ray bundles together to form a new ray bundle.

During shading, the tracker rays are used to determine differential data for active rays in the ray bundle, but tracker rays will not emit further rays. In some cases the tracker rays may actually be processed the same as active rays by the shader program, except that tracker rays do not emit further rays. As described above, a "virtual" bit on each ray in a ray bundle may be used in order to track whether a ray is true or virtual, whether it the virtual intersection is to be computed, and whether to enable its side effects during shading.

The decision as to when to break up a ray bundle may be fairly complex. Just knowing that the rays of a ray bundle all hit the same primitive is not necessarily is enough information on which to base the decision. A single primitive could contain complex geometry, for example, a pile of bolts which are all in one primitive. Checking for the surface normal to be similar is one approach. Another approach is to look at the difference between two ray's intersection "T" values (i.e. the distance that the ray has traversed at the intersection point) and checking them against the gradient of "T" with respect to screen x or y for the hit triangle of each of the rays. If either is more different than a threshold, then the rays may be considered to have diverged. Another approach for knowing when to break a ray bundle is looking at how far apart the hit triangles are in the acceleration structure hierarchy defining the positions of the geometry in the scene. However, the hierarchy can have very "far apart" nodes which are spatially coincident, so the hierarchy distance is not always a good measure of whether rays have diverged.

If the shader asks for the derivative of triangle barycentrics, then virtual intersections are computed in order to get these derivatives, since the rays in a ray bundle are not guaranteed to hit the same triangle.

Differentials will be shared left-right and top-bottom, which may result in less accurate results. Any errors caused by this will often be unnoticeable but sometimes they may be perceptible. The system may offer a high-quality mode where all ray bundles are broken at the start and in which ray differentials are calculated in a standard way, using tracker rays. The efficiencies gained by the ray bundling would be lost, but the quality would not be compromised by ray bundling.

As described above, the ray bundles could be quadrays having a 2×2 group of rays. Larger ray bundles may be used (e.g. 3×3 or 4×4, or even non-square bundles), e.g. if it is found that coherency amongst the rays is the common case. Larger ray bundles would have the advantage of not having the left-right and up-down sharing of differential data, if the edge rays of the larger bundles were virtual rays. For example, a 4×4 ray bundle could be used, in which only the lower left 3×3 rays of the ray bundle are valid rays and the upper and right edges are all virtual rays and the 16 instances could be processed together. This would provide high quality because no sharing of different data for valid rays would occur. However, larger ray bundles may take longer to finish intersection testing (because all rays of the ray bundle finish intersection testing before shading of any of the rays of the ray bundle commences), and may be more prone to ray divergence and splitting of rays from the ray bundle.

FIG. 1 illustrates a graphics processing unit 102 comprising a bundling module 104, intersection testing logic 106, processing logic 108, an image buffer 110 and a local memory. The local memory includes a primitive memory 114, a ray memory 116 and a shader memory 118. The different types of memory in the memory 112 may be implemented as separate memories or as distinct sections within a single memory. The primitive memory 114 stores data relating to primitives to be rendered in a scene; the ray memory 116 stores data relating to rays to be processed for rendering the scene; and the shader memory 118 stores shader programs to be executed by the processing logic 108 for rendering the scene. The bundling module 104, intersection testing logic and processing logic 108 may be implemented in hardware, software or a combination thereof. Hardware implementations allow acceleration of fixed functions, e.g. using fixed-function circuitry to perform common tasks. In particular, the bundling module 104 and the intersection testing logic may be implemented wholly or partially in hardware to accelerate their functionality. The different components of the graphics processing unit 102 can communicate with each other via a bus within the graphics processing unit 102. The intersection testing logic 106 is configured to test rays for intersection with geometry in a scene to be rendered. The processing logic 108 comprises one or more execution cores and is configured to process graphics data for rendering an image. The image buffer 110 is configured to store rendered pixel values.

Figure 2:
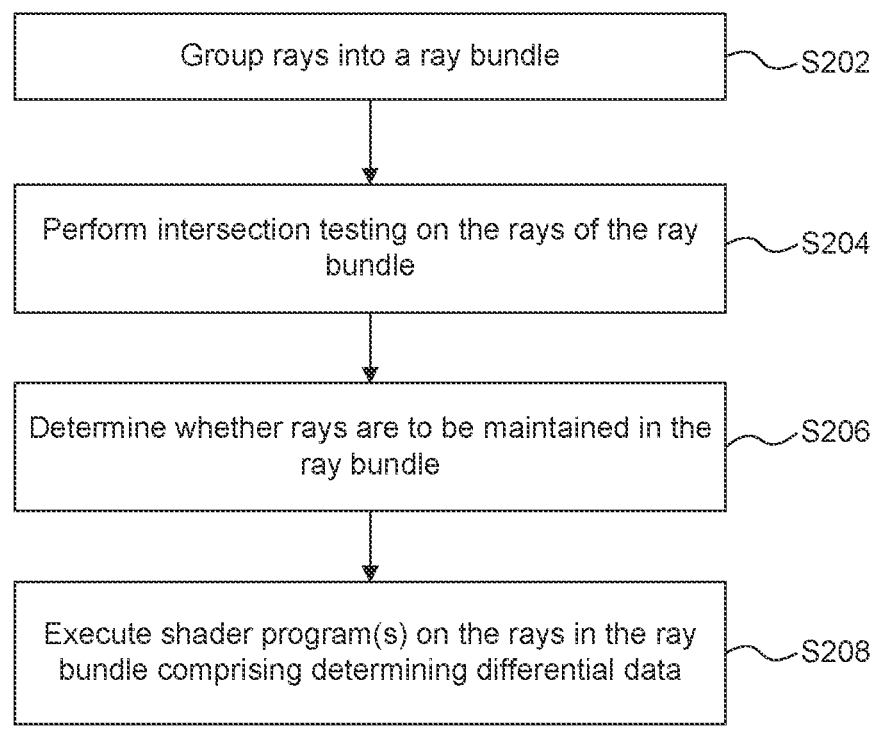
FIG. 2 is a flow chart for a method of graphics processing.

An example of the operation of the graphics processing unit 102 is described with reference to the flow chart in FIG. 2.

Graphics data representing objects in a scene is received at the graphics processing unit 102. The graphics data may comprise primitives which represent surfaces of objects to be rendered. Primitives are often triangles, but can take other forms, e.g. other two-dimensional shapes, or points or lines. A primitive may be defined by a set of vertices, e.g. three vertices define a triangular primitive. The graphics data may include vertex data (e.g. position data and attribute data, such as texture data) for the vertices of the primitives in the scene and indications for the primitives to indicate which of the vertices form the primitives. The graphics data might also define attributes of light sources of the scene being rendered (e.g. position, direction, colour, etc.).

Figure 3:
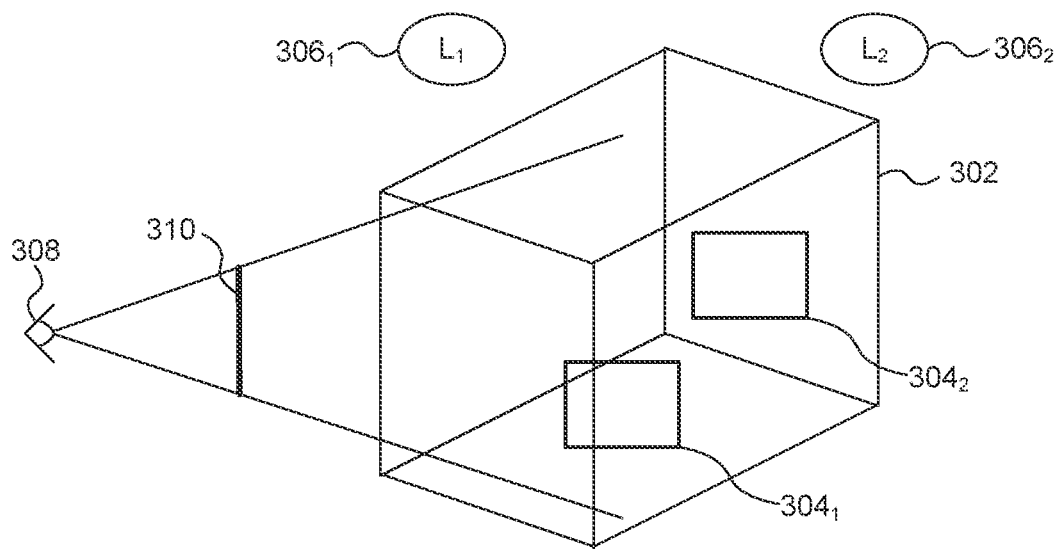
FIG. 3 illustrates a scene to be rendered from a viewpoint.

The graphics processing unit 102 operates to identify visible surfaces for pixels of an image being rendered. A ray tracing approach may be used wherein rays are traced to determine the appearance of pixels in the scene. Rays are traced from an origin and the intersection testing logic 108 determines intersections of the rays with geometry in the scene. FIG. 3 shows an example of a scene 302 which includes two surfaces 3041 and 3042. This is a very simple example, and in other examples there would likely be many more surfaces and objects within the scene. FIG. 3 shows two light sources 3061 and 3062 which illuminate objects in the scene. The viewpoint from which the scene is viewed is shown at 308 and the view plane of the frame to be rendered is represented at 310.

Figure 4:
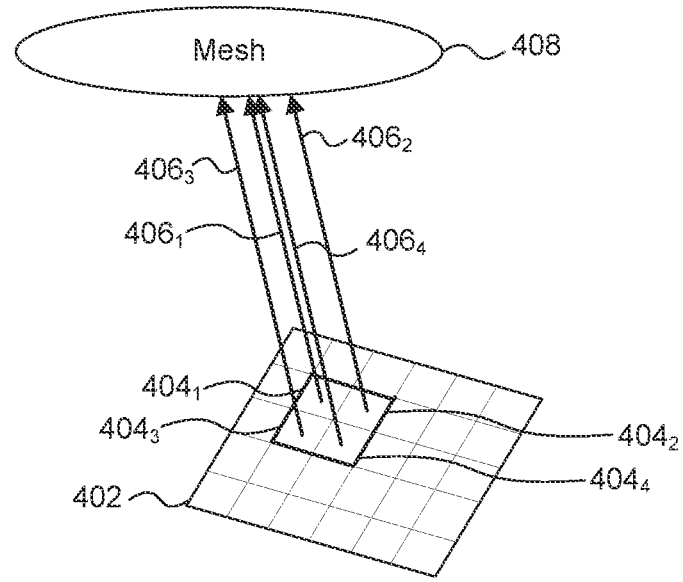
FIG. 4 illustrates an example of a bundle of rays which do not split.

In step S202 the bundling module 104 groups rays together into a ray bundle. For example, four adjacent rays may be bundled together. FIG. 4 shows an example of a surface 402 from which rays are to be emitted. Rays may be emitted as the result of a shader execution. Four rays 4061 to 4064 are shown in FIG. 4 being emitted from a respective four adjacent locations 4041 to 4044 on the surface 402. The four rays 4061 to 4064 may be grouped together into a ray bundle (a quadray).

In step S204 the intersection testing logic 106 performs intersection testing on the rays 406 of the ray bundle to determine whether the rays intersect with geometry in the scene. The intersection testing may be performed separately for each ray 406 in the ray bundle. In the example shown in FIG. 4 all of the rays 406 of the ray bundle intersect with the same mesh 408.

In step S206 the results of the intersection testing for the rays 406 of the ray bundle are used to determine whether the rays 406 are to be maintained in the ray bundle. The determination of step S206 may be performed by the intersection testing logic 106, the bundling module 104, the processing logic 108 or some other logic in the graphics processing unit 102 (not shown in FIG. 1). In the example shown in FIG. 4 the rays 406 are maintained in the same ray bundle because they all intersect with the same mesh 408. All of the rays 406 are marked as valid in the ray bundle.

In step S208 the processing logic 108 executes one or more shader programs on the rays 406. The execution of the shader programs includes determining differential data for a particular ray of the ray bundle using data for another ray of the ray bundle. For example, the ray 4061 may use the ray 4063 as a DY ray (in this case −y) and may use the ray 4062 as a DX ray (in this case +x); the ray 4062 may use the ray 4064 as a DY ray (in this case −y) and may use the ray 4061 as a DX ray (in this case −x); the ray 4063 may use the ray 4061 as a DY ray (in this case +y) and may use the ray 4064 as a DX ray (in this case +x); and the ray 4064 may use the ray 4062 as a DY ray (in this case +y) and may use the ray 4063 as a DX ray (in this case −x). No additional tracker rays are processed for determining the differential data for the rays 406 of the ray bundle. The shader execution may result in the emission of further rays (e.g. secondary rays). The rays resulting from the shading of the rays 406 in the ray bundle may (or may not) be bundled together in another ray bundle, depending on a decision made, e.g. by the bundling module 104.

Figure 5:
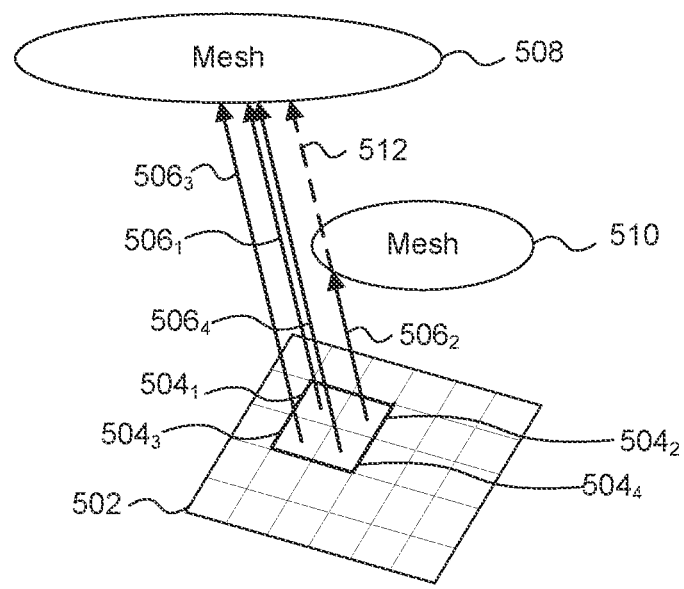
FIG. 5 illustrates an example of a bundle of rays which do split.

FIG. 5 shows an example of a surface 502 from which rays are to be emitted. Rays may be emitted as the result of a shader execution. Four rays $506_1$ to $506_4$ are shown in FIG. 5 being emitted from a respective four adjacent locations $504_1$ to $504_4$ on the surface 502. The four rays $506_1$ to $506_4$ may be grouped together into a ray bundle (a quadray) in step S202.

In step S204, intersection testing is performed for each of the rays 506. In this example, three of the rays ($506_1$, $506_3$ and $506_4$) have matching intersection testing results: they each intersect with mesh 508. However, ray $506_2$ intersects with a different mesh 510. Therefore in this example, the intersection testing results of ray $506_2$ do not match the intersection testing results of the other three rays. Therefore, in step S206 the ray $506_2$ is not maintained in the ray bundle. The remaining three rays $506_1$, $506_3$ and $506_4$ may be maintained in the ray bundle. The data for the ray $506_2$ is still processed in the ray bundle and used as a tracker ray 512. It is marked as a tracker ray in the ray bundle data structure. The tracker ray 512 is determined to intersect with a plane extended version of the intersection of one or more of the rays $506_1$, $506_3$ and $506_4$.

In step S208 the processing logic 108 processes the remaining rays ($506_1$, $506_3$ and $506_4$) in the ray bundle as usual, using the ray 512 as a tracker ray. The true ray $506_2$ is processed separately to the ray bundle by the processing logic 108.

Examples described herein are intended to leverage the concepts of OpenGL and in some examples specifically the specification for OpenGL ES 3.1. The annexes 1 to 11 show example code illustrating how an interface may be used, and how an API may be implemented for footprint tracking/differentials.

In some embodiments, some rays may carry associated differential data while other rays need not. For example rays that contribute to the rendering of primary visibility from a camera or rays used to render specular reflections can utilize the differential data to perform anti-aliasing calculations while rays intended to probe whether a light source is occluded from a surface point may not require differential data. Therefore some implementations can make use of different data structures to represent different categories of rays, and some of those data structures may forego storage for differential information.

In embodiments where ray intersections trigger the execution of shaders, the shading semantic may include a key word, qualifier, alternative data type or similar programmer-specifiable mechanism to indicate that a variable or ray attribute may benefit from differential data. When such a programming semantic is present, the implementation can select between data stored in another track of a ray bundle or data stored as additional data payload of a single ray.

When the implementation is operating on a single ray, many operations must be duplicated or triplicated to perform the same operations on one or more differential tracks. Alternatively, when the implementation is operating on a bundle of rays, potentially including tracker rays, a separate shader instance performs the additional operations in parallel, so it is unnecessary to execute any additional code within the primary instance.

Functions can be provided to explicitly set derivative values belonging to different tracks. These functions are useful to set the starting conditions for differential values when differentials are tracked with the payload of a single ray. These functions may be unnecessary and may be ignored when initializing ray bundles.

Figure 6:
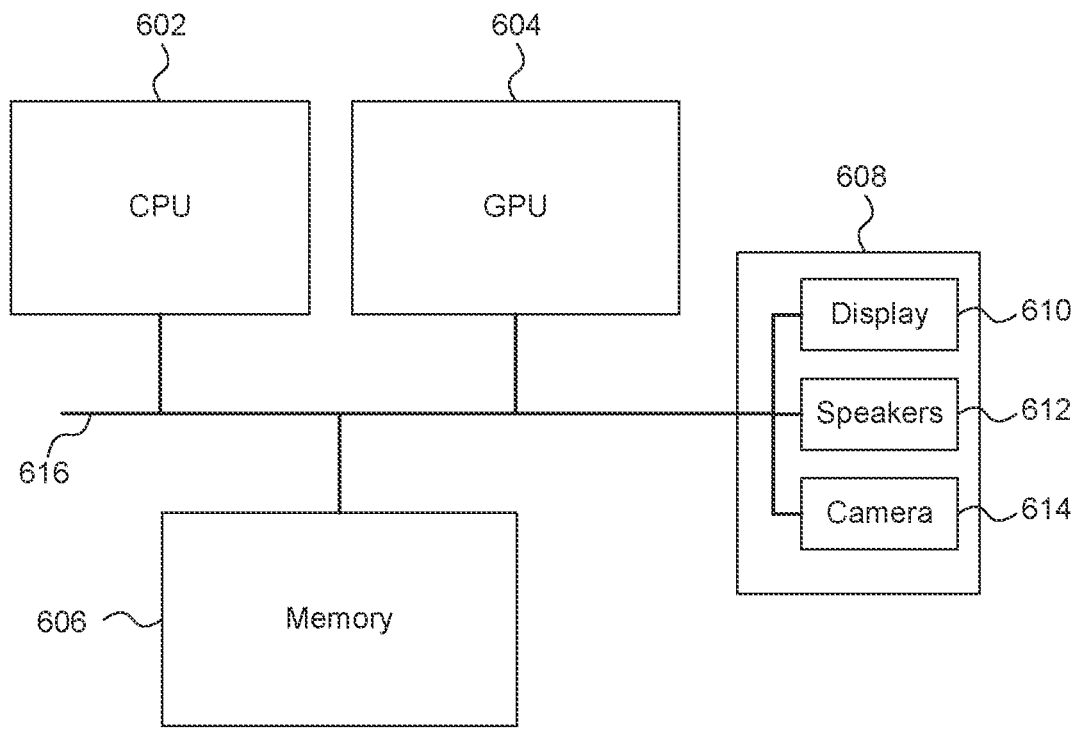
FIG. 6 shows a computer system in which a graphics processing system is implemented.

FIG. 6 shows a computer system in which the graphics processing units described herein may be implemented. The computer system comprises a CPU 602, a GPU 604, a memory 606 and other devices 608, such as a display 610, speakers 612 and a camera 614. The GPU 604 may correspond with the GPU 102 described above. The memory 606 may correspond with the memory 104 described above. The components of the computer system can communicate with each other via a communications bus 616.

The graphics processing unit 102 is shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 7.

Figure 7:
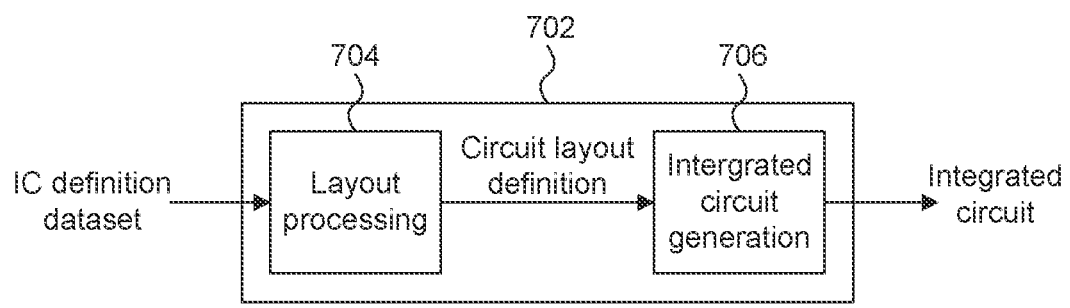
FIG. 7 shows an integrated circuit manufacturing system for generating an integrated circuit embodying a graphics processing system.

FIG. 7 shows an example of an integrated circuit (IC) manufacturing system 702 which comprises a layout processing system 704 and an integrated circuit generation system 706. The IC manufacturing system 702 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 702 to manufacture an integrated circuit embodying a graphics processing unit as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of processing rays in a ray bundle in a graphics processing system, the method comprising:
    executing a plurality of instances of a shader program, an instance corresponding to a ray of the ray bundle;
    wherein the shader program is operable to utilize data determined by the execution of an instance of the shader program corresponding to a first ray of the ray bundle in the execution of an instance of the shader program for a further ray of the ray bundle.

2. The method of claim 1, further comprising:
    emitting a secondary ray from each of two or more instances of the shader program; and
    grouping the secondary rays into another ray bundle.

3. The method of claim 2, wherein said two or more instances of the shader program correspond to rays of the ray bundle.

4. The method of claim 1, further comprising performing intersection testing on the rays of the ray bundle.

5. The method of claim 4, wherein said executing a plurality of instances of a shader program is performed in response to results of said performing intersection testing on the rays of the ray bundle.

6. The method of claim 4, further comprising using results of the intersection testing for the rays of the ray bundle to determine whether the rays are to be maintained in the ray bundle, wherein rays are maintained in the ray bundle if they have matching intersection testing results, wherein rays are considered to have matching intersection testing results if:
    the rays intersect with the same primitive;
    the rays intersect with the same mesh;
    the rays intersect with the same object;
    the intersections invoke the same one or more shader programs to be executed;
    the difference between surface normals at the intersection points is below an angular threshold; or
    the difference between the ray depths in the intersection points is below a depth threshold.

7. The method of claim 1, further comprising receiving an indication via an API to indicate that a plurality of rays are intended to be coherent, wherein the method further comprises grouping said plurality of rays together into the ray bundle on the basis of the received indication.

8. The method of claim 1, further comprising constructing a data structure representing the rays in the ray bundle, wherein full precision ray data is stored in the data structure, and wherein difference data is stored in the data structure for one or more of the rays of the ray bundle representing differences in the ray data compared to the full precision ray data stored in the data structure.

9. The method of claim 8, wherein said full precision ray data is stored in the data structure for one of the rays of the ray bundle, and wherein said difference data is stored in the data structure for the other rays of the ray bundle.

10. The method of claim 1, wherein the execution of an instance of the shader program for said further ray of the ray bundle comprises determining differential data for said further ray of the ray bundle using data for said first ray of the ray bundle.

11. The method of claim 10, wherein the differential data is indicative of a gradient for the further ray.

12. The method of claim 1, wherein the instances of the shader program are executed in parallel for different rays of the ray bundle.

13. The method of claim 1, further comprising splitting a ray from the ray bundle if the ray does not have matching intersection testing results with other rays in the ray bundle.

14. The method of claim 1, further comprising, if a ray of the ray bundle does not have matching intersection testing results with other rays in the ray bundle, marking the ray as a tracker ray in the ray bundle, wherein tracker rays are used to determine differential data for other rays in the bundle.

15. The method of claim 1, wherein the rays to be grouped together are emitted due to the execution of a shader program, wherein a decision as to which rays to group together into a ray bundle is defined in the shader program causing the rays to be emitted.

16. The method of claim 1, wherein a ray bundle comprises:
four rays corresponding to a 2×2 block of fragments; or
sixteen rays corresponding to a 4×4 block of fragments, wherein only a 3×3 block of the rays are valid rays and the remaining rays are tracker rays.

17. A graphics processing unit configured to process rays in a ray bundle, the graphics processing unit comprising processing logic configured to execute a plurality of instances of a shader program, an instance corresponding to a ray of the ray bundle, wherein the shader program is operable to utilize data determined by the execution of an instance of the shader program corresponding to a first ray of the ray bundle in the execution of an instance of the shader program for a further ray of the ray bundle.

18. The graphics processing unit of claim 17, further comprising ray memory for storing ray data for the rays of the ray bundle, wherein the ray memory is configured to store data for the rays of a ray bundle in a data structure, wherein the data structure for the ray bundle comprises:
full precision ray data for one of the rays of the ray bundle; and
difference data for the other rays of the ray bundle representing differences in the ray data compared to the full precision ray data stored in the data structure.

19. The graphics processing unit of claim 17,
wherein the full precision ray data comprises: (i) a floating point 3-component vector to represent a ray origin, and (ii) a floating point 3-component vector to represent a ray direction; and
wherein the difference data comprises, for each of said one or more of the rays of the ray bundle: (i) three limited precision delta vectors for a ray origin, and (ii) three limited precision delta vectors for a ray direction.

20. A non-transitory computer readable storage medium having stored thereon computer readable instructions that, when executed at a computer system, cause the computer system to perform a method of processing rays in a ray bundle in a graphics processing system, the method comprising:
executing a plurality of instances of a shader program, an instance corresponding to a ray of the ray bundle;
wherein the shader program is operable to utilize data determined by the execution of an instance of the shader program corresponding to a first ray of the ray bundle in the execution of an instance of the shader program for a further ray of the ray bundle.

* * * * *